US008953892B2

(12) United States Patent
Vitaladevuni et al.

(10) Patent No.: US 8,953,892 B2
(45) Date of Patent: Feb. 10, 2015

(54) EFFICIENT INNER PRODUCT COMPUTATION FOR IMAGE AND VIDEO ANALYSIS

(71) Applicant: Raytheon BBN Technologies Corp., Cambridge, MA (US)

(72) Inventors: Shiv N. Vitaladevuni, Cambridge, MA (US); Pradeep Natarajan, Cambridge, MA (US); Rohit Prasad, Acton, MA (US); Premkumar Natarajan, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 163 days.

(21) Appl. No.: 13/668,582

(22) Filed: Nov. 5, 2012

(65) Prior Publication Data

US 2014/0126824 A1 May 8, 2014

(51) Int. Cl.
*G06K 9/46* (2006.01)
*G06K 9/68* (2006.01)

(52) U.S. Cl.
USPC ............................................ 382/190; 382/218

(58) Field of Classification Search
CPC ............ G06K 9/6249; G06K 9/00624; H04N 7/26989
USPC ................................................ 382/190, 218
See application file for complete search history.

(56) References Cited

U.S. PATENT DOCUMENTS 5,872,864 A * 2/1999 Imade et al. .................. 382/176

OTHER PUBLICATIONS

Chung-Lin Huang; Shih-Hung Hsu, "Road sign interpretation using matching pursuit method," Image Analysis and Interpretation, 2000. Proceedings. 4th IEEE Southwest Symposium , vol., No., pp. 202,206, 2000.*
Nir Ailon and Bernard Chazelle. 2006. "Approximate nearest neighbors and the fast Johnson-Lindenstrauss transform". In Proceedings of the thirty-eighth annual ACM symposium on Theory of computing (STOC '06). ACM, New York, NY, USA, 557-563.*
Ping Li, Trevor J. Hastie, and Kenneth W. Church. 2006. "Very sparse random projections". In Proceedings of the 12th ACM SIGKDD international conference on Knowledge discovery and data mining (KDD '06). ACM, New York, NY, USA, 287-296.*
Vitaladevuni, et al., "Efficient Orthogonal Matching Pursuit Using Sparse Random Projections for Scene and Video Classification," 2011 IEEE International Conference on Computer Vision, Nov. 6-13, 2011, pp. 2312-2319.

* cited by examiner

*Primary Examiner* — Utpal Shah
(74) *Attorney, Agent, or Firm* — Occhiuti & Rohlicek LLP

(57) ABSTRACT

A computationally efficient approach to determining inner products between feature vectors is provided that eliminates or reduces the need for multiplication, and more specifically, provides an efficient and accurate basis selection for techniques such as Orthogonal Matching Pursuit.

21 Claims, 2 Drawing Sheets

EFFICIENT INNER PRODUCT COMPUTATION FOR IMAGE AND VIDEO ANALYSIS

BACKGROUND

This invention relates to an approach to efficient computation of inner products, and in particular relates to efficient inner product computation in image or video processing.

A number of image and video analysis approaches involve computation of feature vector representations for an entire image or video, or portions (e.g., spatial patches) of such representations. Approaches to determining similarity of vector representations include distance-based and direction-based approaches. An example of a distance-based approach uses a Euclidean distance (i.e., square root of the sum of squared differences of corresponding elements of the vectors), while an example of a direction-based approach uses an inner product metric (i.e., a sum of the products of corresponding elements of the vectors). Some approaches involve projection of a vector representation unto a basis vectors from a predetermined set. Such projections also involve inner product calculations.

Projection approaches include basis selection approaches in which the basis vectors to represent a particular feature vector are selected from a larger predetermined "dictionary" of basis vectors. One such approach is called "Orthogonal Matching Pursuit (OMP)" in which a series of sequential decisions to add basis vectors for the representation are made. These decisions involve computations of inner products between the as-yet unselected basis vectors from the dictionary and a residual vector formed from the component of the feature vector not yet represented in the span of the selected basis vectors from the dictionary.

One prior approach to computation of an inner product between two vectors u and v uses a random projection technique. The Johnson-Lindenstrauss theorem is a basis for "Location Sensitive Hashing" (LSH) for a given a data vector v, a bit vector $h(v) \in \{0,1\}^p$ is computed such that $$h_i(v) = \begin{cases} 1 & r_i^T v \geq 0 \\ 0 & \text{otherwise} \end{cases}$$

$$i \in 1 \ldots p$$

Here, $r_i$'s are random projection vectors, and p is the number of projections. Let $\lfloor x \rfloor$ denote an operator such that $\lfloor x \rfloor = 1$ if $x \geq 0$ else $\lfloor x \rfloor = 0$. Let P be a projection matrix of random vectors $P = [r_1 \ldots r_p]^T$. We can write the bit-vector construction as $h(v) = \lfloor Pv \rfloor$.

As a consequence of the Johnson-Lindenstrauss theorem, the dot-product between two data vectors, u and v, can be approximated with the hamming distance between their bit vectors, $\|h(u) - h(v)\|_1$ $$u^T v \approx \|u\|_2 \|v\|_2 \cos\left(\pi \frac{\|h(u) - h(v)\|_1}{p}\right)$$

Another prior approach provides a way of choosing P to be sparse, with non-zero entries that are ±1. An approach referred to as "Comparison Random Projection" (CRP) uses a construction of P as:

$$P_{ij}^{CRP} = \sqrt{\frac{q}{m}} \begin{cases} +1 & \text{with probability } 1/2q \\ 0 & \text{with probability } 1 - 1/q \\ -1 & \text{with probability } 1/2q \end{cases}$$

for example, where q=1 or 3. Because the projection Pv does not require multiplications, the overall computation is reduced.

Another prior approach provides a way of choosing P as a product of a sparse random projection (SRP) matrix $P^{SRP}$ with s non-zero elements per row drawn from normal distribution multiplied by a Hadamard matrix H and a random ±1 diagonal matrix D as:

$$P^{FJLT} = P^{SRP} HD$$

Note that a sparse feature vector v applied to the projection $P^{FJLT} v$ can be computed as $P^{FJLT} = P^{SRP} (HDv) = P^{SRP} \tilde{v}$ where $\tilde{v} = HDv$ has the effect of making $\tilde{v}$ non-sparse even if v is sparse.

There is a need for computationally efficient approaches to determining inner products between feature vectors, and more specifically, there is a need for efficient and accurate basis selection for techniques such as Orthogonal Matching Pursuit.

SUMMARY

In one aspect, in general, a method for machine-implemented image feature processing includes accepting a data representation of a plurality of m dimensional feature vectors v representing a processing of an image or video signal. For each feature vector v, a p dimensional binary vector h is formed from the data representation of the first feature vector v using to first procedure. This first procedure includes transforming the feature vector v to form a transformed first feature vector $\tilde{v}$, including applying a machine implemented computation to compute elements of the transformed feature vector as an additive combination of elements of the feature vector. Each element of h is determined according to a sign of a selected additive combination of elements of $\tilde{v}$. For each feature vector v a data transformation of the feature vector v is formed by computing at least one approximation of an inner product of v with another vector u using a second procedure including comparing the bit vector h formed from v with a bit vector formed from u. An image analysis process is then performed according to the plurality of transformed feature vectors.

Advantages can includes reducing or eliminating the need for multiplication operations, thereby increasing processing speed, reducing power requirements for processing, and/or reducing circuit complexity of processing hardware. Furthermore, the approach can improve the accuracy of the approximation of the inner product in situations in which one or both of the input vectors are sparse or have a small number of relatively larger magnitude elements. This advantage can be particularly significant when an input vector to an inner product is a residual vector in a sequential basis selection (e.g., Orthogonal Matching Pursuit) procedure.

Other features and advantages of the invention are apparent from the following description, and from the claims.

DESCRIPTION

The use of a computationally efficient inner product is described in the context of an Orthogonal Matching Pursuit (OMP) for determining representations of feature vectors for image or video signals received by a signal analysis system. It should be understood that this same approach to efficient computation of inner products is applicable in a variety of other image and video analysis approaches.

Generally, the OMP approach can be summarized as follows, recognizing that computational implementations do not necessarily implement mathematical operations in the order or manner as shown. A dictionary $\Phi=[a_i; i=1, \ldots, n]$ with $a_i \in \mathbb{R}^m$ such that $m \ll n$ and $\mathbb{R}^m = \text{Span}(\Phi)$. We also assume that the $a_i$ are unit norm vectors. Very generally, the OMP process involves an iteration selecting vectors $a_{k_1}, a_{k_2}, \ldots$ from the dictionary for representing a feature vector $v$ such that at the $p^{th}$ iteration, $k_p$ is chosen such that $$k_p = \underset{k}{\arg\max} |a_k^T v_{p-1}|$$

where $v_p$ is the residual $(I-P_{S_p})v$ where $P_{S_p}$ is a projection onto the span of $S_p = \{a_{k_1}, \ldots, a_{k_p}\}$, and $v_0 = v$. The coefficients of the selected dictionary entries are selected to optimize $\|v - \Phi^T \alpha\|$ where $\alpha$ where has non-zero entries at the selected elements $k_1, k_2, \ldots k_p$.

Note that determining the $p^{th}$ value $k_p$ can take $n-p+1$ inner products. Although certain approximations of this step are known, the computation of the inner products in the selection of the dictionary elements remains a key computation requirement in the OMP and similar approaches.

Figure 1:
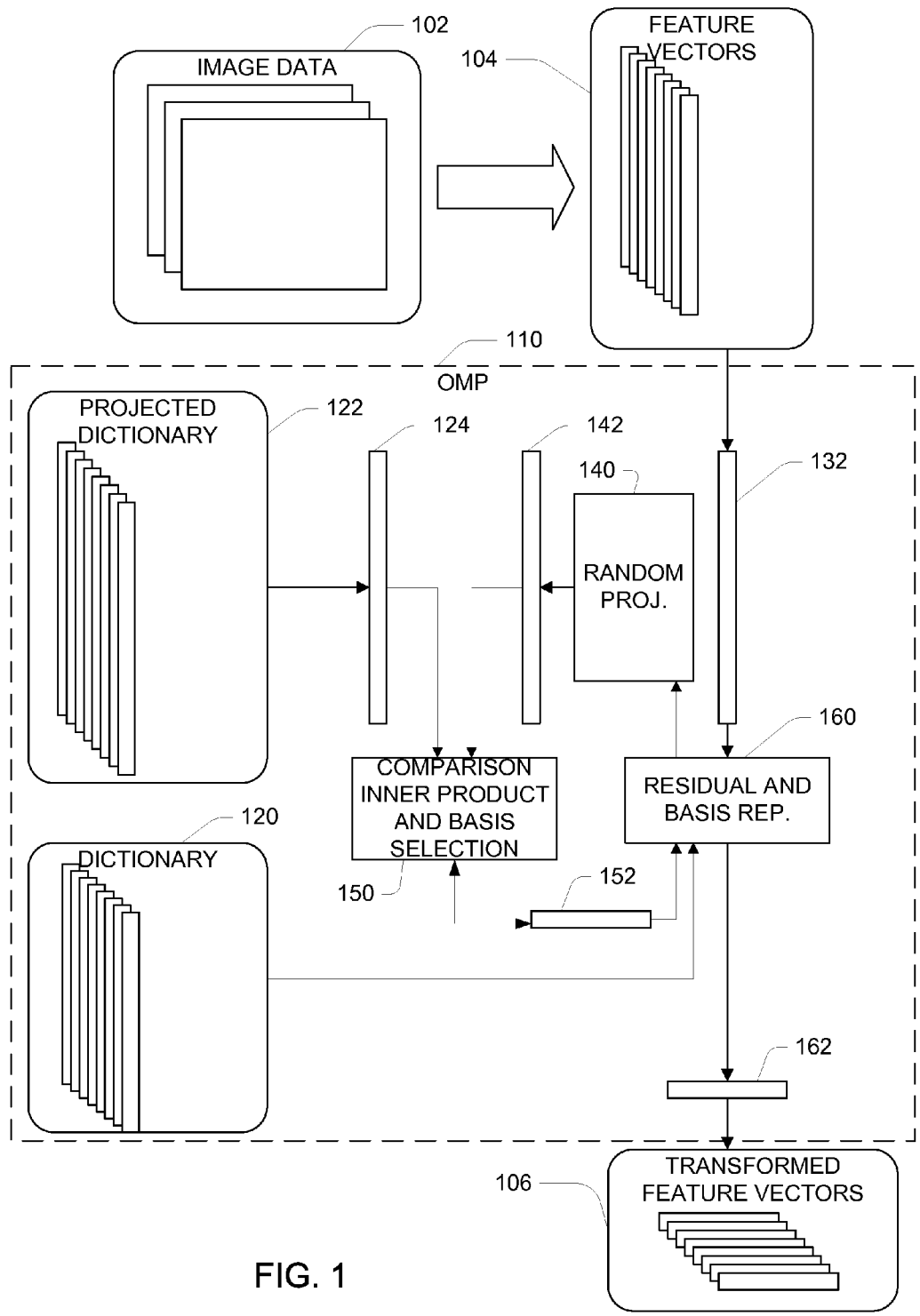
FIG. 1 is a block diagram of a image feature processing system and FIGS. 2A-2B are flowcharts.
Figure 2A:
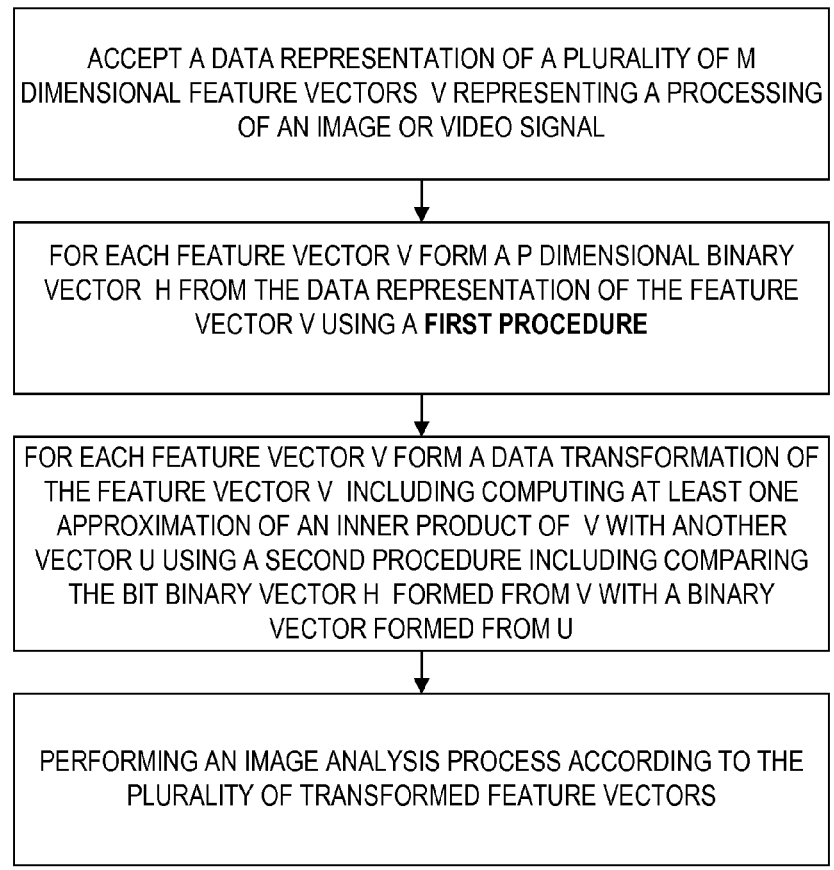
Figure 2B:
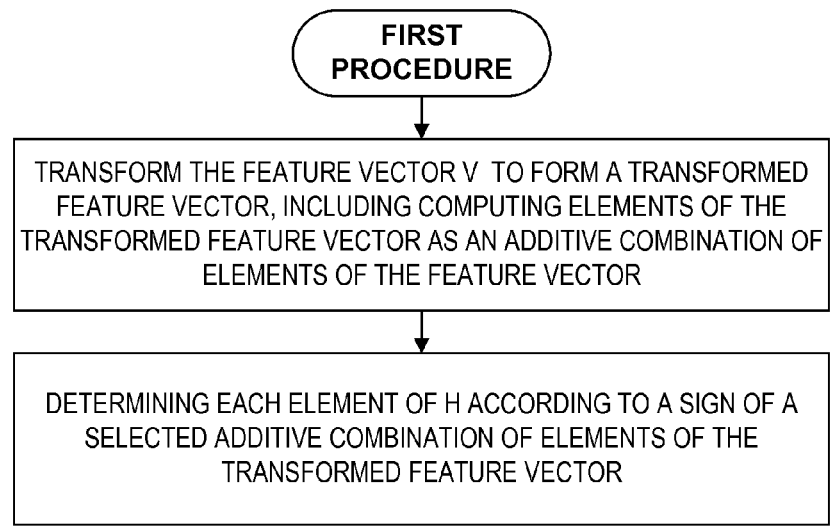

Referring to FIG. 1 and the flowcharts in FIGS. 2A-B a feature processing system for image and video analysis includes an OMP module 110 that receives feature vectors x 104 and produces transformed feature vector $\alpha$ 106. In various examples, the feature vectors v are formed from images 102 (e.g., acquired using a digital camera of a physic scene) according a selection of conventional feature extraction approaches. For example, the feature vectors may be pixel values or portions of images or SIFT vectors. Generally, each input feature vector x is processed by the OMP module is represented as a vector $\alpha$ such that $$x \approx \sum_{i=1}^{p} \alpha_{k_i} a_{k_i}.$$

The coefficients $\alpha_k$ of the selected dictionary vectors $a_k$ are determined using a procedure described below with further reference to FIG. 1. The transformed feature vectors are then applied to image analysis tasks, such as scene detection using conventional techniques. Optionally, these vectors are applied to processing using techniques described in a co-pending application titled "IMAGE ANALYSIS USING COEFFICIENT DISTRIBUTIONS WITH SELECTIVE BASIS FEATURE REPRESENTATION," Ser. No. 13/668,886, filed on Nov. 5, 2012, which is incorporated by reference.

An approach to computing an inner product $u^T v$ between two vectors (e.g., between a dictionary vector and a feature vector or a residual of the feature vectors) uses a comparison random projection approach. First, transformed vectors $\tilde{u} = HDu$ and $\tilde{v} = HDv$ are computed. Note that multiplication by the Hadamard matrix H (which has entries $\pm 1$), the a random $\pm 1$ diagonal matrix D, or their product does not involve multiplications. Rather, such a product involves only addition or subtraction of the elements of the vector being multiplied, with each entry occurring only once in the sum (i.e., either as a positive or negative term in the sum). Therefore, this matrix product does not require multiplications (i.e., does not include multiplications or sets of additions that effectively implement multiplications). Note that because $H^T H = nI$ and $D^T D = I$, $u^T v = \tilde{u}^T \tilde{v}/n$. Then we define $$h(v) = \lfloor P\tilde{v} \rfloor = \lfloor PHDv \rfloor.$$

and chose P as the sparse matrix $P^{CRP}$ as defined above $P^{CRP}$ $$P_{ij}^{CRP} = \sqrt{\frac{q}{m}} \begin{cases} +1 & \text{with probability } 1/2q \\ 0 & \text{with probability } 1 - 1/q \\ -1 & \text{with probability } 1/2q \end{cases}$$

with $q=3$ so that the inner product is approximated as $$u^T v \approx \|u\|_2 \|v\|_2 \cos\left(\pi \frac{\|h(u) - h(v)\|_1}{p}\right)$$

Note that because $P^{CRP}$ has non-zero entries that are $\pm 1$, the matrix computation $P\tilde{v}$ does not require multiplications in its implementation. When the original feature vector v is of dimension m, H and D are $m \times m$ matrices, and $P^{CRP}$ is an $m \times p$ rectangular matrix, generally with $p > m$ and s non-zero entries per row, s/2 positive and s/1 negative. For example, for m=64 (e.g., pixel values in 8×8 patches), p=248 and s=2, 8, 16, 24 or 32.

Referring again to FIG. 1, processing of an input vector x involves computing inner products between x or residuals v computed from x and dictionary vectors $a_i$. In FIG. 1, a projected dictionary 122 represents precomputations of $h(a_i)$ $h(a_i) = PHDa_i$ for all the dictionary elements in a dictionary 120. Note that such precomputation is not required, and the computations of $h(a_i)$ may be performed during operation.

Computation of a transformed feature vector $\alpha$ corresponding to the input vector x involves an iteration processing successive residuals $v_p$ 142, where $v_0 = h(x) = \lfloor PHDx \rfloor$ is computed by a random projection module 140. $h(v_p) = \lfloor PHDv_p \rfloor$ $p^{th}$ the OMP procedure involves a search $$k_p = \underset{k}{\arg\max} |a_k^T v_{p-1}| = \underset{k}{\arg\min} \|h(a_k) - h(v_{p-1})\|_1$$

where $\|h(a_k) - h(v_{p-1})\|_1$ is computed by the comparison inner product module 150, which also controls the search (arg max) over dictionary elements k. The comparison inner product module 150 augments the selected basis 152 with $k_p$. The residual and basis computation module 160 then determined the best coefficient vector $\alpha$ for the selected dictionary items, and computes the next residual $v_p$, which to passes to the random projection module 140, which updates the projected residual $h(v_p)$ 142 for the next iteration.

After all the iterations (e.g., determined by a stopping rule such as a total number of iterations, characteristic of the residual, etc.) the transformed feature vector $\alpha$ 162 is output from the OMP module 110 as one of the transformed feature vectors 106.

Note that application of the transformation HD to the feature and dictionary vectors as described above is only one example of a broader range of transforms that preserve the inner product and that generally reduce the sparse nature of vector. Other choice include Wavelet transforms etc. Furthermore, the choice of sparse random projection $P^{CRP}$ can be replaced with other 0 and ±1 matrices.

Experimental application of the techniques described above have been applied to scene analysis and a novel video classification. The video classification application involves applying the OMP algorithm on visual feature vectors, e.g. Scale Invariant Feature Transform (SIFT), Speeded Up Robust Transform (SURF). After OMP, distribution statistics of the resultant projection coefficients are computed, and then video classification is performed based on these statistics. The video classification application is especially computationally challenging, requiring the use of the OMP algorithm on a very large number of feature vectors. To give an example of the amount of computation, typical feature extraction techniques result in approximately a thousand vectors per video frame; therefore, even a short five minute video clip captured at 30 Hz frame rate will have 9 million feature vectors. Several current video research projects attempt analyzing data sets having hundreds of thousands of videos, effectively requiring processing billions of feature vectors. The algorithmic speedup described here becomes especially crucial in such computationally intensive applications. Further examples, applications, and comparisons to other techniques are found in "Efficient Orthogonal Matching Pursuit using sparse random projections for scene and video classification," *Proc. 2011 IEEE International Conference on Computer Vision (ICCV)*, 6-13 Nov. 2011, pp 2312-2319, which is incorporated herein by reference.

Implementations of the approach described above can include software, hardware, or a combination of hardware and software. For example, a hardware implementation may include special-purpose circuitry for computing the term $\|h(a_k)-h(v_{p-1})\|_1$. Software can include instructions for causing a data processing system to perform steps of the approaches. The data processing system can include a special-purpose processor, a general purpose processor, a signal processor, etc. The instructions can be machine-level instructions, or may be represented in a programming language, which may be compiled or interpreted. The software may be stored on a non-transitory medium (e.g., a volatile or non-volatile memory). In some examples, a system includes image acquisition modules, feature extraction modules, and/or feature extraction modules integrated together with the feature processing involving inner product implementations as described above. Some such examples may include integration within a single integrated circuit or multi-chip module. In some examples, a data representation in a hardware description language (e.g., Verilog) of circuitry for implementing an approach described above may be stored on a non-transitory medium and provided to impart functionality on a device specification system that is uses as part of a process of designing and manufacturing integrated circuits embodying the approach.

It is to be understood that the foregoing description is intended to illustrate and not to limit the scope of the invention, which is defined by the scope of the appended claims. Other embodiments are within the scope of the following claims.

What is claimed is:

1. A method for machine-implemented image feature processing comprising:
   accepting a data representation of a plurality of m dimensional feature vectors v representing a processing of an image or video signal;
   for each feature vector v, forming a p dimensional binary vector h from the data representation of the feature vector v using a first procedure that includes
   transforming the feature vector v to form a transformed feature vector $\tilde{v}$, including applying a machine implemented computation to compute elements of the transformed feature vector as an additive combination of elements of the feature vector, and
   determining each element of h according to a sign of a selected additive combination of elements of $\tilde{v}$;
   for each feature vector v forming a data transformation of the feature vector v including computing at least one approximation of an inner product of v with another vector u using a second procedure including comparing the binary vector h formed from v with a binary vector formed from u;
   performing an image analysis process according to the plurality of transformed feature vectors.

2. The method of claim 1 wherein the transforming of the feature vector v to form $\tilde{v}$ is equivalent to $\tilde{v}=Av$ where A is a matrix with nonzero entries that are ±1.

3. The method of claim 1 wherein the transforming of the feature vector v to form $\tilde{v}$ is equivalent to $\tilde{v}=HDv$ where H is a Hadamard matrix and D is a diagonal matrix with ±1 entries.

4. The method of claim 1 wherein comparing the binary vector h formed from v with a binary vector formed from u comprises determining a count representing a number of corresponding elements of the binary vectors that are equal.

5. The method of claim 1 wherein forming the data transformation of the feature vector v includes forming a basis selection representation by repeatedly applying the second procedure with binary vectors formed from a dictionary of basis vectors.

6. The method of claim 5 wherein the basis selection representation comprises an Orthogonal Matching Pursuit representation.

7. The method of claim 1 where p>m.

8. The method of claim 1 where each selected additive combination of elements of $\tilde{v}$ comprises an additive selection of at most two elements of $\tilde{v}$.

9. The method of claim 1 where each of the additive combination of elements of the feature vector comprises an additive combination of substantially all the elements of the feature vector.

10. The method of claim 1 further comprising acquiring the image or video signal and determining the feature vectors from said signal.

11. The method of claim 1 wherein performing the image analysis process comprises performing a scene matching process.

12. An image processing system comprising a processor configured to perform an image feature processing process, said process comprising:
   accepting a data representation of a plurality of m dimensional feature vectors v representing a processing of an image or video signal;
   for each feature vector v, forming a p dimensional binary vector h from the data representation of the first feature vector v using to first procedure that includes
   transforming the feature vector v to form a transformed first feature vector $\tilde{v}$, including applying a machine implemented computation to compute elements of the transformed feature vector as an additive combination of elements of the feature vector, and
   determining each element of h according to a sign of a selected additive combination of elements of $\tilde{v}$;

for each feature vector v forming a data transformation of the feature vector v including computing at least one approximation of an inner product of v with another vector u using a second procedure including comparing the binary vector h formed from v with a binary vector formed from u;

performing an image analysis process according to the plurality of transformed feature vectors.

13. The system of claim 12 wherein the transforming of the feature vector v to form $\tilde{v}$ is equivalent to $\tilde{v}=Av$ where A is a matrix with nonzero entries that are ±1.

14. The system of claim 12 wherein the transforming of the feature vector v to form $\tilde{v}$ is equivalent to $\tilde{v}=HDv$ where H is a Hadamard matrix and D is a diagonal matrix with ±1 entries.

15. The system of claim 12 wherein comparing the binary vector h formed from v with a bit vector formed from u comprises determining a count representing a number of corresponding elements of the bit vectors that are equal.

16. The system of claim 12 wherein forming the data transformation of the feature vector v includes forming a basis selection representation by repeatedly applying the second procedure with binary vectors formed from a dictionary of basis vectors.

17. Software stored on a non-transitory machine-readable medium comprising instructions for causing a data processing system to perform an image feature processing process, said process comprising:

accepting a data representation of a plurality of m dimensional feature vectors v representing a processing of an image or video signal;

for each feature vector v, forming a p dimensional binary vector h from the data representation of the first feature vector v using to first procedure that includes transforming the feature vector v to form a transformed first feature vector $\tilde{v}$, including applying a machine implemented computation to compute elements of the transformed feature vector as an additive combination of elements of the feature vector, and determining each element of h according to a sign of a selected additive combination of elements of $\tilde{v}$; and for each feature vector v forming a data transformation of the feature vector v including computing at least one approximation of an inner product of v with another vector u using a second procedure including comparing the binary vector h formed from v with a binary vector formed from u.

18. The software of claim 17 wherein the transforming of the feature vector v to form $\tilde{v}$ is equivalent to $\tilde{v}=Av$ where A is a matrix with nonzero entries that are ±1.

19. The software of claim 17 wherein the transforming of the feature vector v to form $\tilde{v}$ is equivalent to $\tilde{v}=HDv$ where H is a Hadamard matrix and D is a diagonal matrix with ±1 entries.

20. The software of claim 17 wherein comparing the binary vector h formed from v with a bit vector formed from u comprises determining a count representing a number of corresponding elements of the bit vectors that are equal.

21. The software of claim 17 wherein forming the data transformation of the feature vector v includes forming a basis selection representation by repeatedly applying the second procedure with binary vectors formed from a dictionary of basis vectors.

* * * * *